US006786512B2

(12) United States Patent
Morin et al.

(10) Patent No.: US 6,786,512 B2
(45) Date of Patent: Sep. 7, 2004

(54) VEHICLE WHEEL SHIELD FOR AIR CONTROL

(76) Inventors: Mark Joseph Morin, 85 Odds's Drive, Restoule, Ontario (CA), P0H 2R0; Dale Richard Vranckx, 279 Front Street, St. Williams, Ontario (CA), N0E 1P0

( * ) Notice: Subject to any disclaimer, the term of this patent is extended or adjusted under 35 U.S.C. 154(b) by 0 days.

(21) Appl. No.: 10/054,936

(22) Filed: Jan. 25, 2002

(65) Prior Publication Data

US 2003/0141713 A1 Jul. 31, 2003

(51) Int. Cl.⁷ .............................................. B62D 25/18
(52) U.S. Cl. ...................... 280/847; 280/851; 280/848
(58) Field of Search ................................ 280/847, 848, 280/849, 154, 851; D12/184, 185; 454/279, 277, 280, 284

(56) References Cited

U.S. PATENT DOCUMENTS

| 1,904,343 A | | 4/1933 | Zaiger et al. |
| 2,605,119 A | | 7/1952 | Earnest |
| 2,759,413 A | * | 8/1956 | Smith et al. ................ 454/280 |
| 2,782,053 A | | 2/1957 | Long |
| 3,088,751 A | * | 5/1963 | Barry et al. ................ 280/851 |
| 3,203,079 A | * | 8/1965 | Smith et al. .................. 72/377 |
| 3,279,818 A | * | 10/1966 | Jones ......................... 280/851 |
| D263,696 S | * | 4/1982 | Regler ....................... D12/185 |
| 4,372,570 A | * | 2/1983 | Goodall ..................... 280/851 |
| 4,382,606 A | | 5/1983 | Lightle et al. |
| D275,706 S | * | 9/1984 | Trombley et al. .......... D25/142 |
| 4,660,846 A | | 4/1987 | Morin |
| 4,921,276 A | | 5/1990 | Morin |
| 5,080,397 A | * | 1/1992 | Metcalf ...................... 280/851 |
| 5,366,247 A | * | 11/1994 | Fischer ....................... 280/851 |
| 5,564,750 A | | 10/1996 | Bajorek et al. |

FOREIGN PATENT DOCUMENTS

| CN | 360425 | 9/1936 |
| CN | 694985 | 9/1964 |
| CN | 1217521 | 2/1987 |
| DE | 4027073 A1 | 3/1992 |
| GB | 1058892 | 2/1967 |
| GB | 2 184 702 | 7/1987 |
| GB | 2250249 A | 6/1992 |

OTHER PUBLICATIONS

European Search Report Application No. 03001618.2–May 26, 2003.

* cited by examiner

Primary Examiner—Brian L. Johnson
Assistant Examiner—Brian Swenson
(74) Attorney, Agent, or Firm—Nixon Peabody LLP; Jeffrey L. Costellia

(57) ABSTRACT

A shield for controlling air, spray and airborne debris generated by a wheel of an automotive vehicle when traveling on a roadway surface. The shield includes a planar frame having front and rear surfaces and top, side and bottom borders. The shield is adapted to be disposed above the roadway surface vertically depending from the vehicle and spaced rearwardly from the vehicle wheel in a plane extending transversely to the vehicle. A plurality of downwardly and rearwardly oriented louvers are fixed on the frame to extend rearwardly beyond its rear surface, so as to be oriented horizontally (when the shield is in position on the vehicle) between the side borders, and the louvers are shaped so as to permit, when the vehicle is moving, a flow of air, spray and airborne debris through the shield and downward deflection thereof as they pass between louvers.

15 Claims, 3 Drawing Sheets

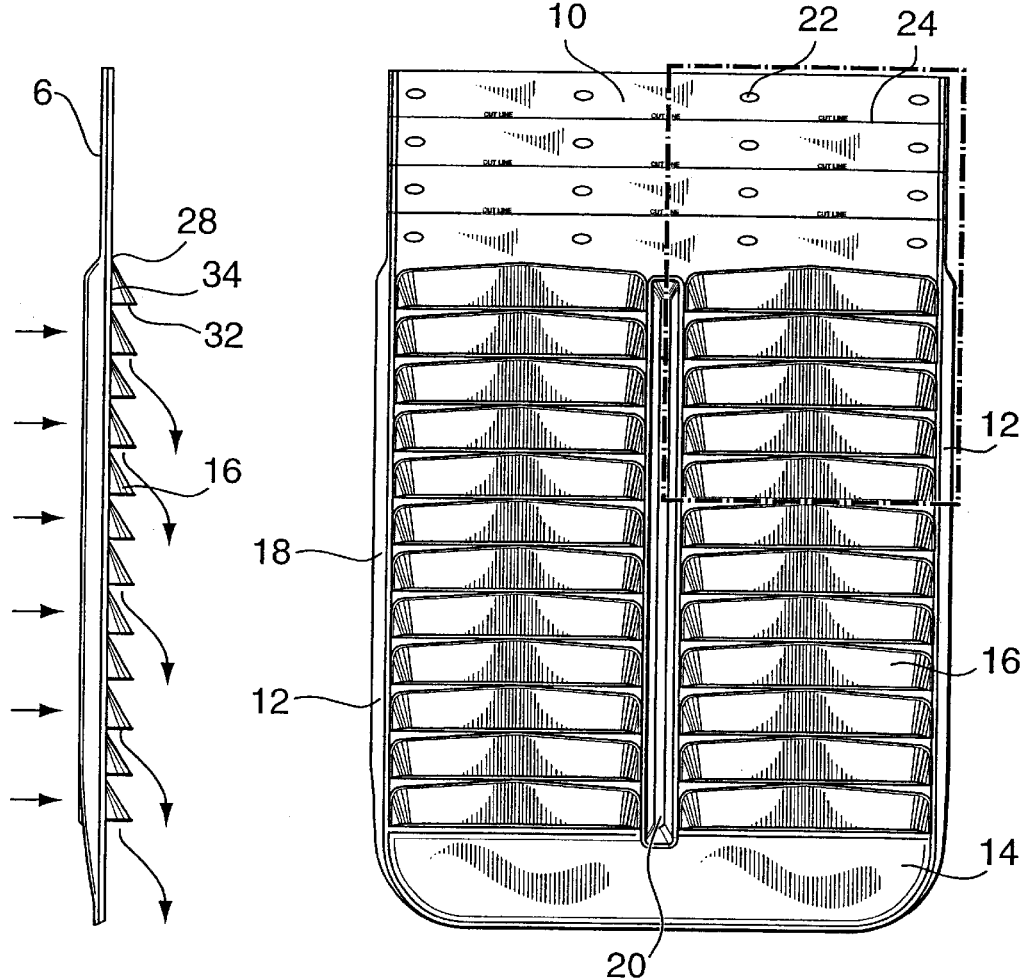
FIG.3
FIG.4
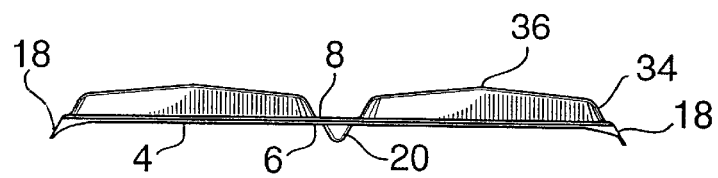
FIG.5

US 6,786,512 B2

VEHICLE WHEEL SHIELD FOR AIR CONTROL

FIELD OF INVENTION

The present invention relates to a spray shield for controlling air, spray and airborne debris generated by a wheel of an automotive vehicle. It relates more particularly to such a shield that is adapted to be suspended in generally vertical orientation and disposed rearwardly of the vehicle's wheels to obstruct the spray of water, sleet, ice, snow and slush, rocks and other forms of airborne debris which may be thrown upwardly and rearwardly or laterally by the wheels during the vehicle's movement, particularly on highways.

BACKGROUND OF THE INVENTION

The present invention is an improvement to the spray shield described and illustrated in Morin, U.S. Pat. No. 4,660,846 issued Apr. 28, 1987. The problem addressed by the present invention and that of this earlier patent, is that—particularly with heavy vehicles such as trucks, tractor trailers and buses—spray and airborne debris such as water, ice, snow, dust, rocks and the like, may be sprayed during that vehicles movement, depending upon the type and condition of the roadway upon which such vehicle is travelling. Such spray and debris may dangerously obstruct visibility of a following vehicle and thus make it impossible for that vehicle to pass safely, or make it dangerous or hazardous to follow behind.

Morin, U.S. Pat. No. 4,660,846 describes and illustrates a type of louvered spray shield having a plurality of vertically aligned downwardly depending contiguous louvers, each louver extending horizontally between side borders when the shield is in position on a vehicle. The louvers permit flow of air, spray and airborne debris through the shield causing downward deflection thereof. As disclosed in Bajorek et al, U.S. Pat. No. 5,564,750 issued Oct. 15, 1996, such a construction of louvered shield also facilitates dispersion of heat generated by the tire and the road surface, thereby increasing tire life, and reduces fuel consumption when compared to conventional solid mud flaps, by reducing air resistance and turbulence otherwise created by such solid flaps.

SUMMARY OF THE INVENTION

It is an object of the present invention to provide a more aerodynamically efficient shield of the type in question, which will be more efficient both in controlling flow of air, spray and debris behind and to the sides of a moving vehicle carrying such shields, while at the same time facilitating fuel saving and extending tire life.

In order to achieve these objects, in accordance with the present invention there is provided a shield for controlling the flow of air, spray and airborne debris generated by a wheel of an automotive vehicle when travelling on a roadway surface, the shield comprising a planar frame having front and rear surfaces and top, side and bottom borders. The shield is adapted to be disposed above the roadway surface vertically depending from the vehicle and spaced rearwardly from the vehicle wheel in a plane extending transversely to the wheel. A plurality of downwardly and rearwardly oriented louvers are fixed on the frame to extend rearwardly beyond its rear surface, so as to be oriented horizontally (when the shield is in position on the vehicle) between the side borders. The louvers are shaped so as to permit when the vehicle is moving flow of air, spray and airborne debris through the shield and downward deflection thereof as they pass between the louvers. The louvers extend across the frame, from top to bottom, in adjacent fashion, the top of each louver extending rearwardly downwardly from the plane of the frame. A bottom edge of each louver where it meets the frame defines the vertical positioning on the shield of the upper edge of the lower adjacent louver. Each louver is arranged and shaped with respect to the frame so that its sides meet the frame and the louver rises slightly outwardly with respect to the frame as the louver extends laterally inwardly from its sides.

In a preferred embodiment of the present invention, the shield further comprises a flap rigidly secured to each side border and angled so as to outwardly and forwardly extend therefrom so as to facilitate the gathering of air, spray and airborne debris as the vehicle to which the shield is attached moves forward, and to direct said air, spray and airborne debris to pass through the louvers.

In another preferred embodiment, the shield has a pair of similarly arranged and shaped sets of louvers positioned side-by-side on the frame and joined along confronting, inner flaps which flaps form a rearwardly oriented V-shaped groove vertically forwardly extending from the frame and separating the two sets of louvers along a central portion of the shield.

As will be described in more detail subsequently, the shield according to the present invention is constructed so as to be aerodynamically suited to collect and direct air, spray and airborne debris generated by a wheel of an automotive vehicle. At the same time, the shield construction according to the present invention is such as to permit structural rigidity, even when the device made of a relatively lightweight material.

BRIEF DESCRIPTION OF THE DRAWINGS

These and other advantages of the invention will become apparent upon reading the following detailed description and upon referring to the drawings in which:

FIG. 3 is a side elevation view of the shield of FIG. 2.

FIG. 4 is a front elevation view of the shield of FIG. 2.

FIG. 5 is a top plan view of the shield of FIG. 2.

Figure 1:
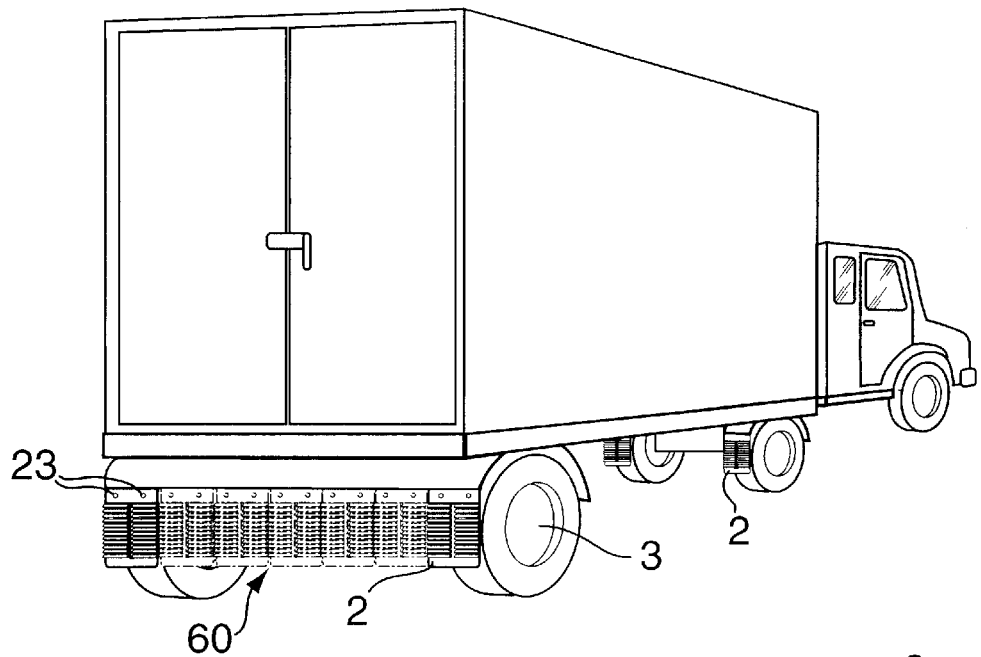
FIG. 1 is a perspective view of a truck trailer equipped with a set of spray shields according to the present invention.
Figure 2:
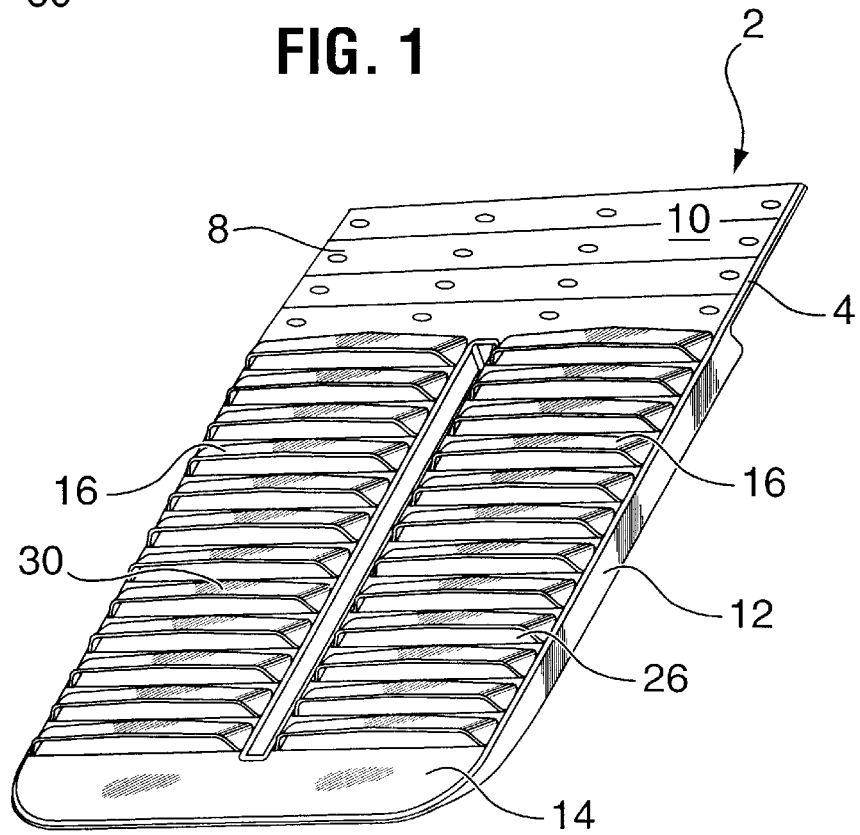
FIG. 2 is a perspective view of one of the shields of FIG. 1.

While the invention will be described in conjunction with the illustrated embodiments, it will be understood that it is not intended to limit the invention to such embodiments. On the contrary, it is intended to cover all alternatives, modifications, and equivalents as may be included within the spirit and scope of the invention as defined by the appended claims.

DETAILED DESCRIPTION OF THE PREFERRED EMBODIMENTS

In the drawings, similar features have been given similar reference numerals.

Turning to FIG. 1, there is illustrated a set of shields (2) in accordance with the present invention. Shields (2) are intended to be vertically mounted behind wheels (3) of a vehicle. As can be seen in FIGS. 2 to 5, shield (2) comprises a planar frame (4) having a front surface (6) and a rear surface (8), the frame formed from a top border (10), side borders (12) and a bottom border (14). These borders hold in position a series of fixed louvers (16), the louvers being shaped and positioned as illustrated.

Along side borders (12) forwardly outwardly extending at an angle of about 120 degrees to the plane of frame (4), are side flaps (18) (FIG. 5) which extend vertically along most of the length of shield (2) as illustrated. The side flaps help to collect and direct air, spray and airborne debris generated by wheel (3) as the vehicle moves forwardly over a road surface. It is preferred that the shield (2) be of integral construction and made for example of sturdy light-weight flexible plastic, rubber, or even, for some applications, metal.

In the embodiment illustrated in FIGS. 2 to 5, two similar sets of louvers (16) are provided on the shield, with inner side flaps (18) of each set being joined as illustrated, to form a rearwardly oriented forwardly extending (from the plane of frame (4)) V-shaped groove (20). If desired, two similar shields (2) can be formed from this single shield, by cutting the shield from top to bottom along a line aligned with the bottom of this groove (20).

As can be seen in FIG. 1, rows of vertically aligned apertures (22) are formed in the top border (10), the shield (2) being secured by appropriate securing means, such as bolts (23), through appropriate apertures (22), in proper position to a vehicle. The top border (10) is also preferably marked with parallel cut lines (24) laterally positioned in parallel fashion between adjacent rows of apertures (22) as illustrated, so that a shield (2) can be cut to a proper vertical size, if required, before it is mounted on the vehicle.

Louvers (16) are specifically constructed so as to enhance the aerodynamics and rigidity of shield (2). In particular, each louver extends horizontally between side borders (18), defining openings (26) in the frame (4), for passage of air, spray and airborne debris during movement of a vehicle to which the shield is attached. Each louver is secured to the frame with its top edge (28) more or less in the plane of the frame and with its body (30) extending downwardly and rearwardly from a top edge to a lower edge (32) (best seen in FIG. 3). The bottom edge 32 of each louver, where it meets frame 4, defines the vertical positioning on the shield 2 of the upper edge 28 of its lower adjacent louver as can be seen again in FIG. 3. Each louver body (30) is joined at its sides (34) to the frame (4) as illustrated. The body (30) of each louver rises slightly at a constant angle of about 2 degrees to the plane of frame (4) (FIG. 5), as the louver progresses laterally inwardly from its sides (34) to its center (36).

This shaping of louver body (30), rising laterally as it does towards its center (36), together with side flaps (18) and groove (20), provides structural rigidity for shield (2) during operation, while at the same time facilitating the efficient aerodynamic flow of air, spray and airborne debris through openings (26) and downwardly behind shield (2) when they have passed openings (26) (FIG. 3). The lower edge (32) of each louver body (30) and the bottoms of its sides (34) lie in a plane angled at about 85 degrees to that of frame (4). This shaping of lower edge (32) and the side bottoms again facilitates aerodynamic flow through the shield.

The aerodynamic flow of air through and downwardly behind shield (2) created by the louvers (16) and their side flaps (18), during movement of the vehicle, also helps to maintain the shield in a more or less vertical orientation when vertically mounted on a vehicle.

Figures 6, 7:
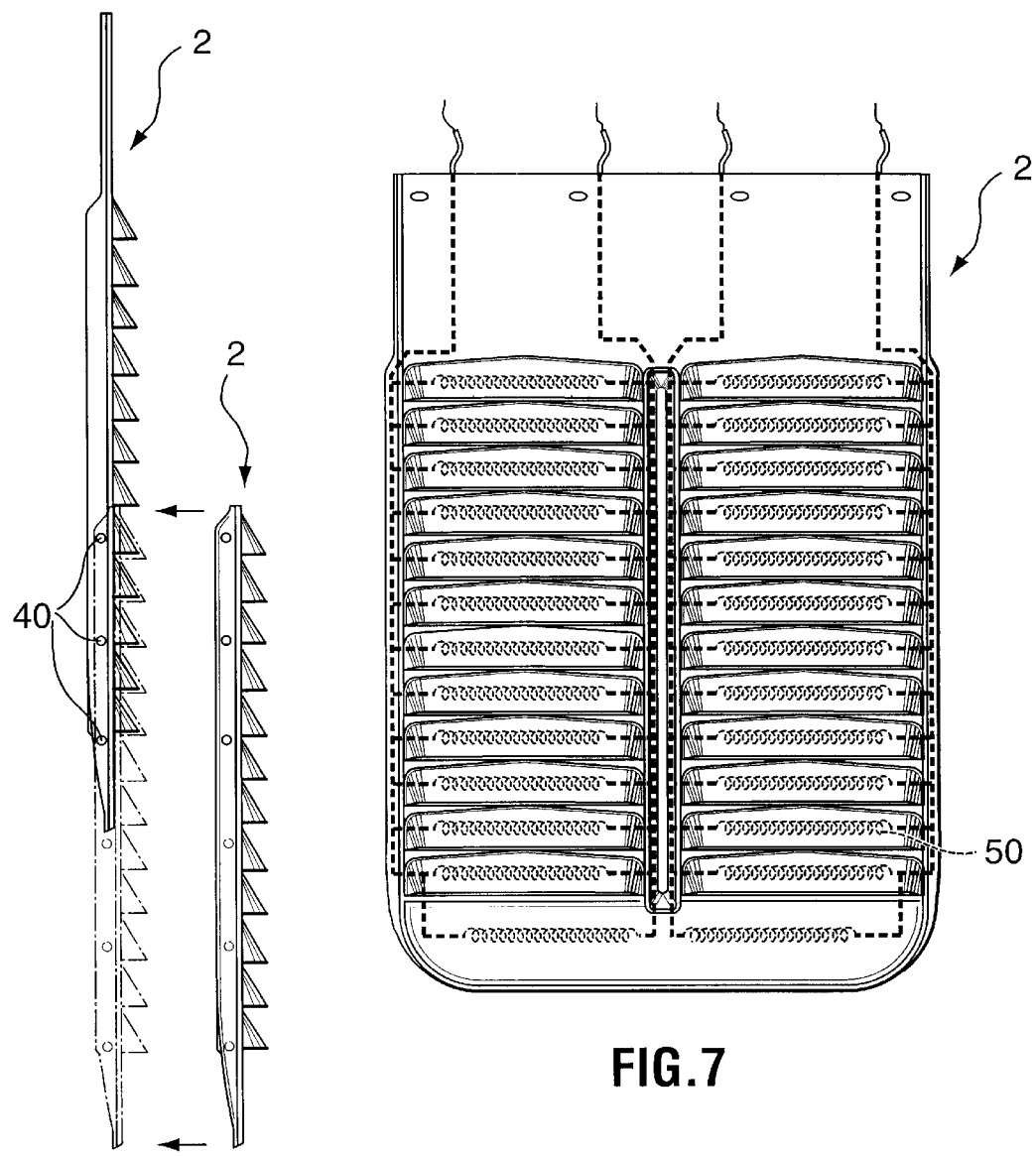
FIG. 6 is a side elevation view of an alternative embodiment of the shield according to the present invention, whereby one shield may be attached to another.
FIG. 7 is a schematic front elevation view of yet another embodiment of the present invention whereby the shield may be heated to thaw collected ice, snow and slush.

As can be seen in FIG. 6, by providing suitable attachment means (40), on confronting surfaces, a pair of shields (2) may be clipped together in stacked, partially overlapped fashion, to provide extended coverage at the rear of a vehicle wheel. This means that a single size of shield (2) may be provided which, when mated appropriately, in overlapping fashion, with another similar shield, will create greater area coverage. Attachment means (40) may be for example bolts (and associated nuts) passing through aligned apertures or any other conventional means.

As illustrated schematically in FIG. 7, where shield (2) is made of a suitable plastic or rubber material, heater wires (50) may be provided so that, when connected to a power source (not shown) for example carried in the vehicle, ice, slush and snow which otherwise might have built up on the shield and closed openings (26), will be melted, ensuring continuous proper flow of air, spray and airborne debris through openings (26).

For dump trucks and the like, shield (2) may be provided with a pivot and means (not illustrated) to enable shield (2) to be appropriately pivoted upwardly, so that it will not be damaged during the trucks dumping operation.

Any number of shields (2) may be provided on a particular vehicle, preferably either behind each wheel or, where wheels are set together in tandem or otherwise, behind each set of such wheels, or behind the rear-most set of wheels of the vehicle.

As well, as illustrated in phantom in FIG. 1, a single, wide shield 60 may be provided to extend laterally across the entire axle and wheel set for the rear-most wheels of a vehicle. This shield may be formed by securing a number of single shields to laterally, or by forming a single, molded piece as illustrated. This construction further enhances the suppression of spray from the rear of the vehicle.

Thus it is apparent that there has been provided in accordance with the invention a shield for controlling air, spray and airborne debris generated by a wheel of an automotive vehicle when travelling on a roadway surface that fully satisfies the objects, aims and advantages set forth above. While the invention has been described in conjunction with specific embodiments thereof, it is evident that many alternatives, modifications and variations will be apparent to those skilled in the art in light of the foregoing description. Thus, for example, the specific number of louvres 16 may be different, depending on a shield 2, depending the specific application intended. As well, the louvres may be of different sizes and shapes (e.g. round, triangular or otherwise). For some applications such as SUV's and pickups, shields 2 may be formed with approximately five louvres with no centre rib 20 (see dotted outline in FIG. 4) would be appropriate. Accordingly, it is intended to embrace all such alternatives, modifications and variations as fall within the spirit and broad scope of the invention.

We claim:

1. A shield for controlling air, spray and airborne debris generated by a wheel of an automotive vehicle when traveling on a roadway surface, the shield comprising:

a planar frame having front and rear surfaces and top, side and bottom borders, the shield adapted to be disposed above the roadway surface vertically depending from the vehicle and spaced rearwardly from the vehicle wheel in a plane extending transversely to the vehicle, a plurality of downwardly and rearwardly oriented louvers fixed on the frame to extend rearwardly beyond its rear surface, so as to be oriented horizontally, when the shield is in position on the vehicle, between the side borders, the louvers shaped so as to permit, when the vehicle is moving, the flow of air, spray and airborne debris through the shield and downward deflection thereof as they pass between louvers, the louvers extending across the frame, from top to bottom in adjacent fashion, a top of each louver extending rearwardly and downwardly from the plane of the frame; a bottom edge of each louver, where it meets the frame, defining the vertical positioning on the shield of the upper edge of the lower adjacent louver, and each louver arranged and shaped with respect to the frame so that its sides meet the frame and the louver rises slightly outwardly with respect to the frame as the louver extends laterally inwardly from its sides to define a peak at the midpoint of the louver.

2. A shield according to claim 1 further comprising a flap rigidly secured to each side border and angled so as to outwardly and forwardly extend therefrom so as to facilitate the gathering of air, spray and airborne debris as the vehicle debris to pass through the louvers.

3. A shield according to claim 2, wherein the flaps extend outwardly and forwardly with respect to the plane of the shield at an angle of about 120 degrees.

4. A shield according to claim 1, wherein the shield is of integral construction.

5. A shield according to claim 2, wherein the shield is of integral construction.

6. A shield according to claim 1, wherein the louvers rise above the plane of the frame at a constant angle of about 2 degrees as they progress laterally from their sides to their centers.

7. A shield according to claim 2, wherein a pair of similarly arranged and shaped sets of louvers are positioned side-by-side on the frame and joined along confronting, inner flaps which flaps form a rearwardly oriented V-shaped groove vertically forwardly extending from the frame and separating the two sets of louvers along a central portion of the shield.

8. A shield according to claim 1, wherein the upper border is provided with rows of vertically aligned, spaced apertures, the rows of apertures being parallel with the louvers, the apertures to receive means whereby the shield may be attached to a vehicle in operative position.

9. A shield according to claim 8, wherein cut lines are marked on the upper border, the cut lines laterally aligned centrally between adjacent rows of apertures and parallel thereto, whereby the shield may be cut laterally, along a selected one of said cut lines, for proper vertical size and positioning of the shield behind a wheel of an automotive vehicle.

10. A shield according to claim 2, wherein the upper border is provided with rows of vertically aligned, spaced apertures, the rows of apertures parallel with the louvers, the apertures to receive means whereby the shield may be attached to a vehicle in operative position.

11. A shield according to claim 10, wherein cut lines are marked on the upper border, the cut lines laterally aligned centrally between adjacent rows of apertures and parallel thereto, whereby the shield may be cut laterally, along a selected one of said cut lines, for proper vertical size and positioning of the shield behind a wheel of an automotive vehicle.

12. A shield according to claim 7, wherein the shield is approximately 24 inches wide and provided with 12 louvers extending over approximately 24 inches in length, from top to bottom of the shield.

13. A shield according to claim 1, wherein the lower edges of each louver are in a plane which meets the plane of the frame of the shield at an angle of about 85 degrees.

14. A shield for controlling air spray and airborne debris generated by the wheels of an automotive vehicle when traveling on a roadway surface, the shield comprising a plurality of shields constructed according to claim 1 laterally secured together along their sides so that they can be mounted to extend across the rear of the vehicle.

15. A shield according to claim 14 of integral construction.

* * * * *